(12) United States Patent
Yasutomi et al.

(10) Patent No.: US 7,715,705 B2
(45) Date of Patent: May 11, 2010

(54) FLASH DEVICE

(75) Inventors: Hiroshi Yasutomi, Tokyo (JP); Yuichiro Nogo, Tokyo (JP)

(73) Assignee: Sony Corporation, Tokyo (JP)

( * ) Notice: Subject to any disclaimer, the term of this patent is extended or adjusted under 35 U.S.C. 154(b) by 257 days.

(21) Appl. No.: 11/896,867

(22) Filed: Sep. 6, 2007

(65) Prior Publication Data

US 2008/0175581 A1   Jul. 24, 2008

(30) Foreign Application Priority Data

Oct. 3, 2006   (JP) ............................ P2006-272211

(51) Int. Cl.
 *G03B 15/03* (2006.01)
(52) U.S. Cl. ................. 396/174; 396/175; 396/198; 348/371; 362/3; 362/419; D16/209
(58) Field of Classification Search ................. 396/198, 396/174; D16/239–240
See application file for complete search history.

(56) References Cited

U.S. PATENT DOCUMENTS

| | | | | |
|---|---|---|---|---|
| 4,238,150 A * | 12/1980 | Quinn | ......................... | 396/174 |
| 4,740,804 A * | 4/1988 | Shands | ........................ | 396/198 |
| 4,893,139 A * | 1/1990 | Alligood et al. | ............. | 396/174 |
| 5,036,345 A * | 7/1991 | Kawano | ...................... | 396/113 |
| 5,095,325 A * | 3/1992 | Carstens | ..................... | 396/198 |
| 5,418,596 A * | 5/1995 | Goto | .......................... | 396/106 |
| 5,839,006 A * | 11/1998 | Beckerman | ................. | 396/174 |
| 6,026,456 A | 2/2000 | Ilkbahar | | |
| 6,157,206 A | 12/2000 | Taylor et al. | | |
| 6,404,987 B1 * | 6/2002 | Fukui | .......................... | 396/56 |
| 6,614,999 B2 * | 9/2003 | Hagiuda et al. | ............. | 396/155 |
| 6,625,397 B2 * | 9/2003 | Nagata | ........................ | 396/106 |

(Continued)

FOREIGN PATENT DOCUMENTS

JP   62-262034 A   11/1987

(Continued)

OTHER PUBLICATIONS

Nikon SB-800 Autofocus Speedlight Instruction manual, obtained from http://www.nikonusa.com/pdf/manuals/Speedlights/SB-800.pdf on Jun. 12, 2009.*

(Continued)

*Primary Examiner*—Clayton E. LaBalle
*Assistant Examiner*—Bret Adams
(74) *Attorney, Agent, or Firm*—Radar, Fishman & Grauer PLLC

(57) ABSTRACT

Disclosed is a flash device which includes a mounting portion removably mounting a flash device on a photographic apparatus, a first base having the mounting portion, a second base mounted on the first base such that the second base can turn around a shaft located approximately parallel with an optical axis of the photographic apparatus, and a flashlight-irradiating unit mounted on the second base such that the flashlight-irradiating unit can turn around a shaft at least in a vertical direction which is orthogonal to the optical axis of the photographic apparatus and is approximately horizontal when the photographic apparatus is located with a horizontal position. In the flash device, the first base has an auxiliary light irradiation unit to irradiate a photographic subject with auxiliary light.

6 Claims, 16 Drawing Sheets

U.S. PATENT DOCUMENTS

| | | |
|---|---|---|
| 6,809,546 B2 | 10/2004 | Song et al. |
| 6,924,660 B2 | 8/2005 | Nguyen et al. |
| 6,928,007 B2 | 8/2005 | Jin |
| 7,019,555 B2 | 3/2006 | Lee |
| 7,034,565 B2 | 4/2006 | Lee |
| 7,034,567 B2 | 4/2006 | Jang |
| 7,064,989 B2 | 6/2006 | Na et al. |
| 7,138,823 B2 | 11/2006 | Janzen et al. |
| 7,151,390 B2 | 12/2006 | Nguyen et al. |
| 7,176,711 B2 | 2/2007 | Park et al. |
| 7,205,787 B1 | 4/2007 | Massoumi et al. |
| 7,218,155 B1 | 5/2007 | Chang et al. |
| 7,221,193 B1 | 5/2007 | Wang et al. |

FOREIGN PATENT DOCUMENTS

| | | | |
|---|---|---|---|
| JP | 09-015485 A | | 1/1997 |
| JP | 09-015689 | * | 1/1997 |
| JP | 2005-099411 | * | 4/2005 |
| JP | 2005-181438 | | 7/2005 |
| JP | 2006-162761 A | | 6/2006 |

OTHER PUBLICATIONS

Nikon Press center press release for announcing release of SB-800 speedlight, obtained from http://web.archive.org/web/20061114070830/http://press.nikonusa.com/2003/07/nikon__introduces__new__sb800__spe.php ; dated Nov. 14, 2006; used for giving publication date of instruction manual.*

Nikon SB-800 flash test review, obtained http://web.archive.org/web/20041204180432/http://www.kenrockwell.com/nikon/sb800.htm ; dated Dec. 04, 2004; used for giving publication date of instruction manual.*

Japanese Office Action for application no. 2006-272211 dated Jul. 22, 2008.

* cited by examiner

FLASH DEVICE

CROSS REFERENCES TO RELATED APPLICATIONS

The present invention contains subject matter related to Japanese Patent Application JP 2006-272211 filed in the Japanese Patent Office on Oct. 3, 2006, the entire contents of which are incorporated herein by reference.

BACKGROUND OF THE INVENTION

1. Field of the Invention

The present invention relates to a flash device suitable for bounced light photography using a photographic apparatus such as a digital still camera or an ordinary camera.

2. Description of the Related Art

Bounced light photography is usually performed when pictures are taken indoors using the photographic apparatus such as a digital still camera and an ordinary camera. In bounced light photography, a photographic subject is indirectly irradiated with flashlight reflected from a ceiling by irradiating a ceiling with flashlight while directing the flash device at the ceiling. With such a technique, inartificial pictures having a clear outline without a shadow can be obtained.

Japanese Unexamined Patent Publication No. 2005-181438 (paragraph No. [0033]) discloses an example of a flash device having a flashlight-irradiating unit 2 on an upper part of a flash device main body 1, such that the flashlight-irradiating unit 2 can turn in a horizontal direction and a vertical direction, as shown in FIGS. 1A and 1B, when the flash device is used in bounced light photography using the photographic apparatus such as a digital still camera or an ordinary camera.

As illustrated in Japanese Unexamined Patent Publication No. 2005-181438, in performing bounced light photography, a flash device having a flashlight-irradiating unit 2 on the upper part of a flash device main body 1 can be mounted on an accessory shoe provided on an upper part of the photographic apparatus, such as a digital still camera and an ordinary camera, as shown in FIGS. 1A and 1B, such that the flashlight-irradiating unit 2 can turn in a horizontal direction and a vertical direction. In performing bounced light photography, the photographic apparatus 3 is located with the horizontal direction to obtain a horizontally wide screen or in the vertical direction to obtain a vertically long screen, as shown in FIGS. 1A and 1B, and then a ceiling is irradiated with flashlight by directing the flashlight-irradiating unit 2 of the flash device at the ceiling.

However, as illustrated in Japanese Unexamined Patent Publication No. 2005-181438, in a case where the flashlight-irradiating unit 2 is mounted on the upper part of the flash device main body 1 such that flashlight-irradiating unit 2 can turn in the horizontal direction and the vertical direction, the flashlight-irradiating unit 2 is located with the horizontal direction, as shown in FIG. 1A, when bounced light photography is performed using the photographic apparatus 3 in the horizontal position. Further, the flashlight-irradiating unit 2 is located with the vertical direction, as shown in FIG. 1B, when bounced light photography is performed using the photographic apparatus 3 in the vertical position. Furthermore, when bounced light photography is performed using a photographic apparatus such as a digital still camera or an ordinary camera in the horizontal position and in the vertical position, irradiating conditions of the flashlight may vary with the conditions where photographic subjects are photographed. If the flashlight-irradiating unit 2 is once located with the horizontal position as shown in FIG. 1A and is caused to turn in a horizontal direction thereafter, a photographer may have to carry out a laborious procedure before actually photographing the photographic subjects and may not be able to concentrate on photographing.

According to an embodiment of the present invention, the photographer can concentrate on photographing since the irradiating conditions of the flashlight can remain constant and an irradiation direction can be set easily when the bounced light photography is performed using the photographic apparatus, such as a digital still camera or an ordinary camera, in the horizontal position and the vertical position.

SUMMARY OF THE INVENTION

A flash device according to an embodiment of the present invention has a mounting portion removably mounting the flash device on a photographic apparatus. The flash device includes a first base having the mounting portion, a second base mounted on the first base such that the second base can turn around a shaft and is located approximately parallel with an optical axis of the photographic apparatus, and a flashlight-irradiating unit mounted on the second base such that flashlight-irradiating unit can turn at least in the vertical direction around a shaft that is orthogonal to the optical axis of the photographic apparatus and is approximately horizontal when the photographic apparatus is located with the horizontal position. In addition, the flash device has an auxiliary light irradiation unit on the first base to irradiate a photographic subject with auxiliary light of the photographic apparatus.

According to an embodiment of the present invention, the second base is mounted on the first base on the photographic apparatus, such that the second base can turn around the shaft that is approximately parallel with the optical axis of the photographic apparatus. Further, the flashlight-irradiating unit is mounted on the second base such that the flashlight-irradiating unit can turn at least in the vertical direction around the shaft that is orthogonal to the optical axis of the photographic apparatus and that is approximately horizontal when the above-described photographic apparatus is located with the horizontal position. Thus, the photographer is able to concentrate on photographing photographic subjects since the irradiating conditions of the flashlight can remain constant and the irradiation direction can easily be set when bounced light photography is performed with the photographic apparatus, such as a digital still camera or an ordinary camera, in the horizontal position and in the vertical position.

BRIEF DESCRIPTION OF THE DRAWINGS

FIG. 1A is a front view in performing bounced-light photography in a vertical direction; and FIG. 2B is a front view in performing bounced light photography in a horizontal direction;

DESCRIPTION OF THE PREFERRED EMBODIMENTS

Hereinafter, an example of the best mode for carrying out an embodiment of a flash device according to the present invention is described by referring to the accompanying drawings.

Figure 2:
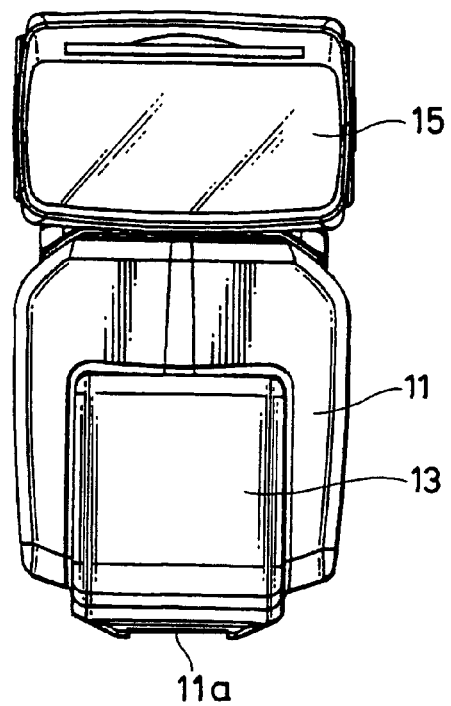
FIG. 2 is a front view showing a normal position of one example of a best mode for carrying out an embodiment of a flash device according to the present invention.
Figure 3:
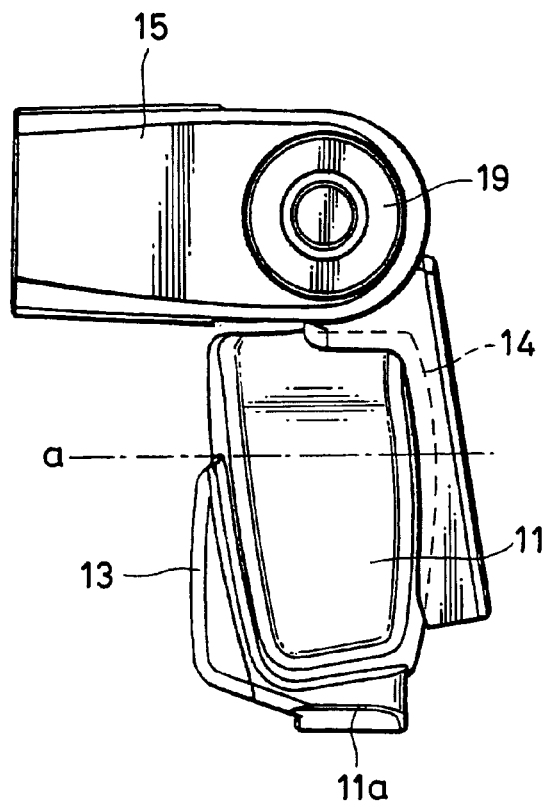
FIG. 3 is a right side view of FIG. 2.
Figure 4:
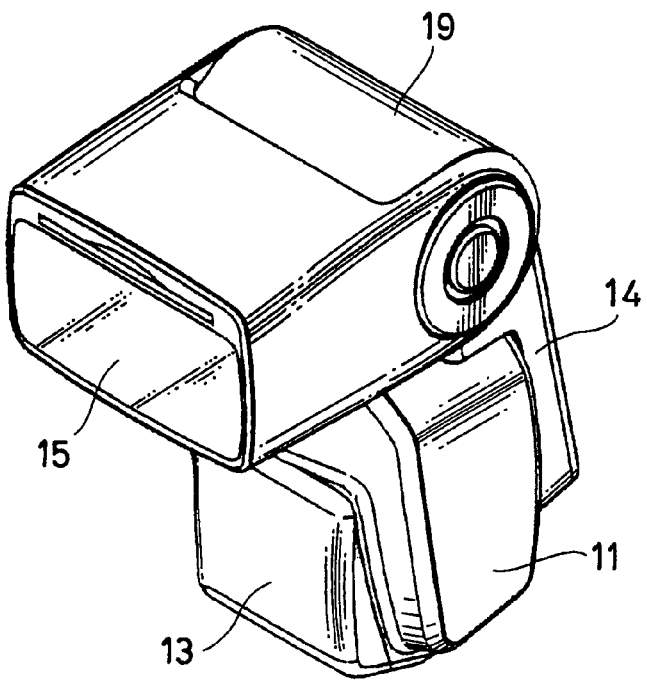
FIG. 4 is a front side perspective view of FIG. 2.
Figure 5:
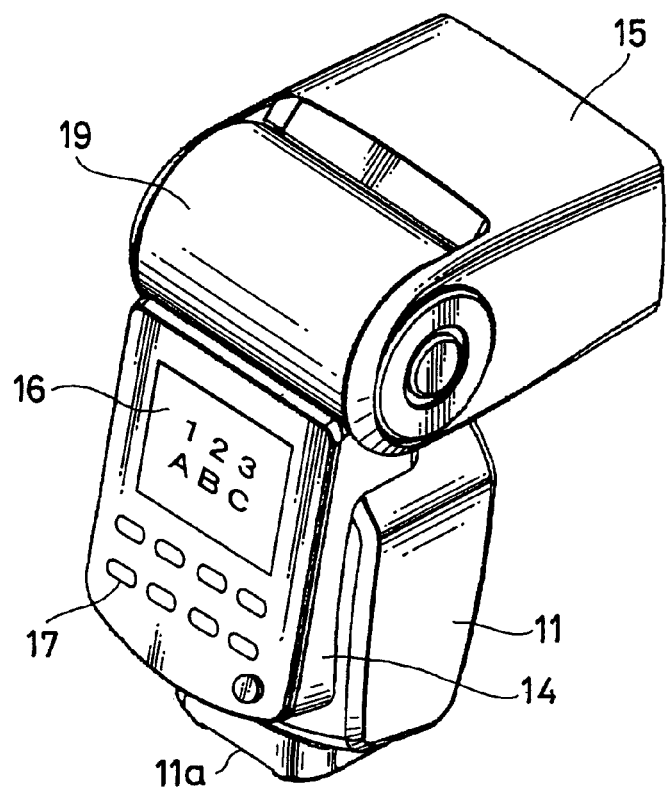
FIG. 5 is a rear side perspective view of FIG. 2.

FIG. 2 shows a front (front side) view of a normal position (horizontal position) in which a direction of flashlight emitted from a flashlight-irradiating unit 15 of a flash device according to an embodiment of the present invention is in parallel with an optical axis of a photographic lens in a photographic apparatus; FIG. 3 shows a right side view of FIG. 2; FIG. 4 shows a front side perspective view of FIG. 2; and FIG. 5 shows a rear side perspective view of FIG. 2.

In FIG. 2 to FIG. 5, a reference numeral 11 shows a first base in which a mounting portion 11a is provided such that the flash device is removably mounted on a mounting portion 12a of an accessory shoe and the like in a later-described photographic apparatus 12, such as a digital still camera or an ordinary camera. When the flash device is mounted securely on the mounting portion 12a of the accessory shoe and the like in the photographic apparatus 12, such as a still camera, by connecting the device to the mounting portion 11a of the first base 11, the first base 11 has a fixed positional relation with the photographic apparatus 12.

In this embodiment, an auxiliary light irradiation unit 13 irradiating a photographic subject side of the photographic apparatus 12 with focusing auxiliary light is provided on the front side of the first base 11, as shown in FIG. 2, FIG. 3 and FIG. 4. The focusing auxiliary light is irradiated when the photographic apparatus 12 adjusts the focus on the photographic subject.

The auxiliary light irradiation unit 13, for example, generally includes an LED and a lens mounted on the front of the LED. In addition, a prescribed pattern, such as a vertical-striped irradiation pattern, is formed on the lens of the auxiliary light irradiation unit 13. The focusing auxiliary light is irradiated from the auxiliary light irradiation unit 13 before capturing a photographic subject image so that the focus can be adjusted by irradiating the photographic subject with the vertical-striped pattern.

In this case, since the auxiliary light irradiation unit 13 irradiating a photographic subject side of the photographic apparatus 12 with focusing auxiliary light is provided on the front side of the first base 11, a positional relationship between the photographic apparatus 12 and the auxiliary light irradiation unit 13 is constant and unchanged according to this embodiment. Thus, an excellent focus can always be obtained.

Figure 6:
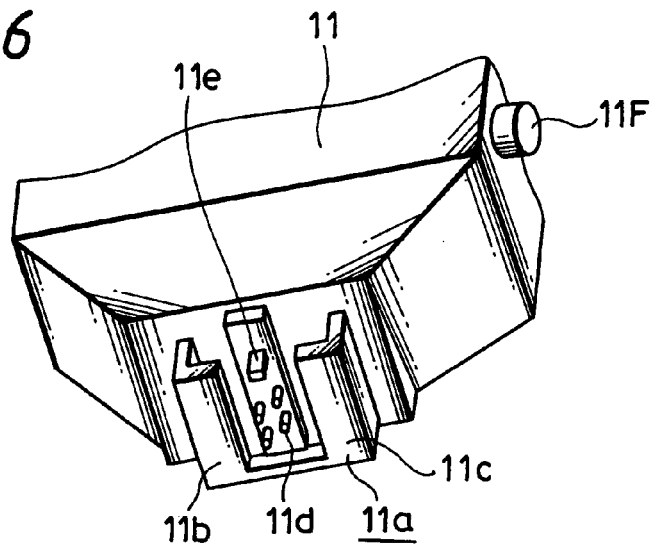
FIG. 6 is a perspective view showing an example of a mounting portion of a first base.

The mounting portion 11a of the first base 11 is configured such that a retractable communication terminal 11d and a locking portion 11e are provided between mutually faced, reverse, L-shape guide bodies 11b and 11c composing a pair, as shown in FIG. 6, and a detaching button 11f can be pressed to unlock the locking portion 11e.

Figure 7:
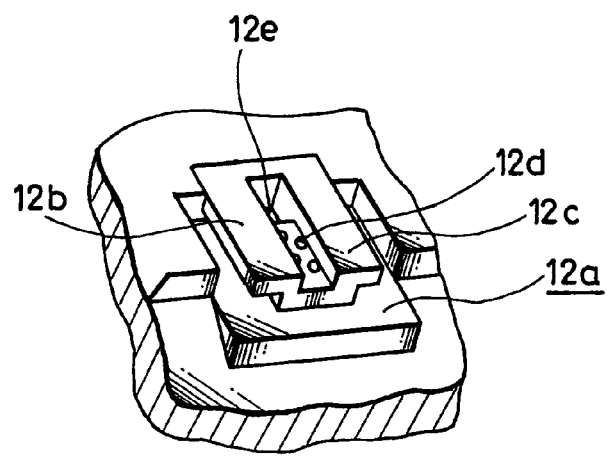
FIG. 7 is a perspective view showing an example of a mounting portion of a photographic apparatus.

In addition, the mounting portion 12a provided on the upper part of the photographic apparatus 12 is configured such that a communication terminal 12d and a locking concave portion 12e are provided between slidable pieces 12b and 12c composing a pair that slides between the reverse L-shaped guide bodies 1ib and 11c of the mounting portion 11a of the first base 11, as shown in FIG. 7, for example.

A second base 14 is mounted on the rear side of the first base 11 such that the second base 14 can turn around a shaft which is approximately parallel with the optical axis of the later-described photographic apparatus 12, as shown in FIG. 3, FIG. 4 and FIG. 5. In this case, the first base 11 and the second base 14 have a spherical contact with a prescribed radius such that contact surfaces of the first base 11 and second base 14 are a convex on the first base 11 side and a concave on the second base 14 side, respectively. Since the contact surfaces of the first base 11 and second base 14 have a spherical contact as described above, the second base 14 can turn relatively to the first base 11 in a excellent manner, and no visible gap exists between the second base 14 and first base 11 when viewing from the side.

A display unit 16 displaying a setting state of a later-described flashlight-irradiating unit 15, such as a flashlight reaching distance, a focal length of a zoom head, or a rotational angle of the flashlight-irradiating unit 15 is provided on the rear side of the second base 14, as shown in FIG. 5. Since the display unit 16 is provided on the rear side of the second base 14, a photographer 20 can always see the display of the normal position.

Operation buttons 17 setting a prescribed display on the display unit 16 are provided in the vicinity of the display unit 16 as a setting unit.

Figure 8:
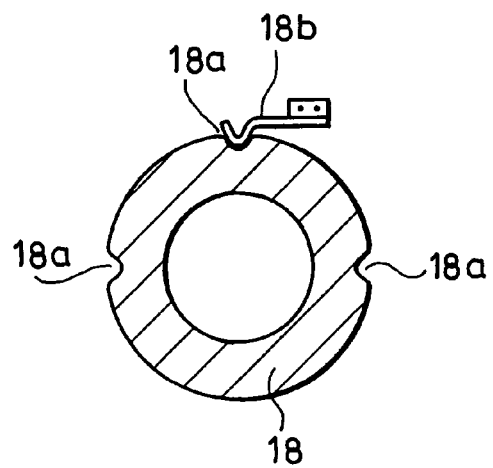
FIG. 8 is a configuration diagram showing an example of a temporary fixing unit.

A temporary fixing unit, such as a click mechanism, temporarily fixing the second base 14 when the second base 14 is turned 90° relative to the first base 11, is provided in this embodiment. As the temporary fixing unit, engagement convex units 18a are provided in an outer circumference of a cylinder 18 provided in the normal position, as shown in FIG. 8, and also provided in positions turned 90° into the right and into the left around the rotary shaft as a center in the second base 14, and an engagement spring piece 18b engaging with the engagement concave unit 18a is provided in the first base 11. Thus, the photographer 20 can see that the second base 14 is turned 90° relative to the first base 11 without visual observation.

The flashlight-irradiating unit 15 has a horizontally rectangular light-emitting unit mounted on the second base 14 such that the flashlight-irradiating unit 15 can turn around a shaft 19 at least in the vertical direction, is located orthogonal to the optical axis of the later-described photographic apparatus 12 and is approximately horizontal when the photographic apparatus is horizontally placed as shown in FIG. 3, FIG. 4 and FIG. 5.

Since the flash device is configured in the manner as described above in this embodiment, the flash device is securely mounted on the mounting portion 12a of the accessory shoe and the like by connecting the mounting portion 12a to the mounting portion 11a of the first base 11 of the flash device in the photographic apparatus 12, such as a digital still camera and an ordinary camera, when capturing a photographic subject image.

Figure 9:
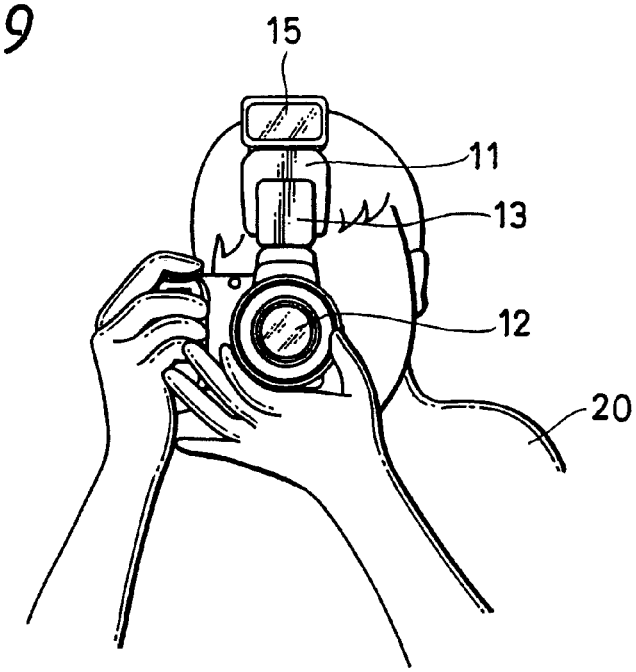
FIG. 9 is a front view showing a state in which the flash device of the normal position according to the embodiment of the present invention is mounted on the photographic apparatus.
Figure 10:
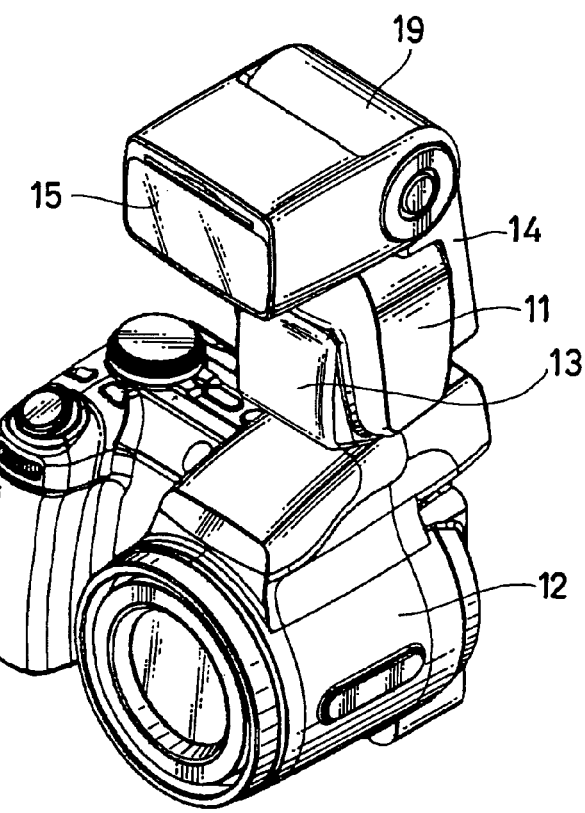
FIG. 10 is a front side perspective view showing a state in which the flash device of the normal position according to the embodiment of the present invention is mounted on the photographic apparatus.
Figure 11:
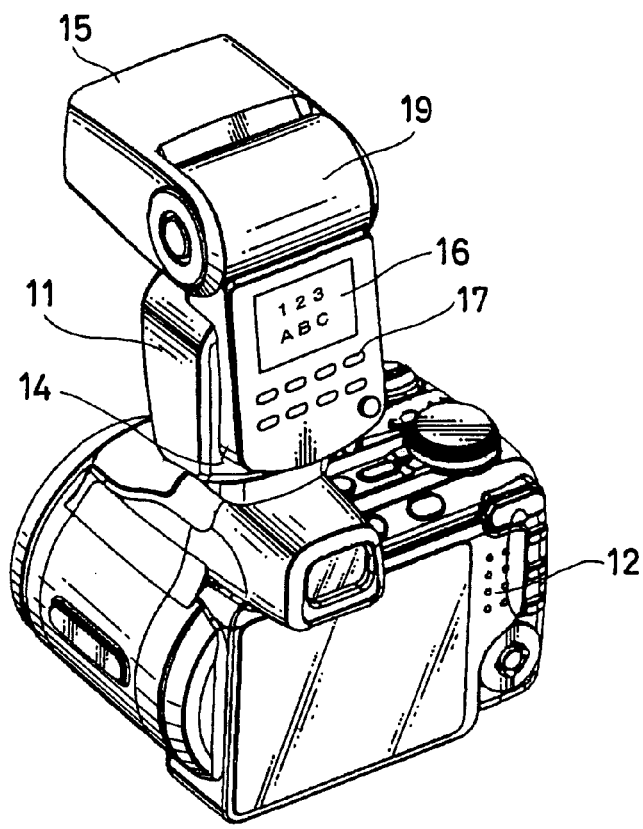
FIG. 11 is a rear side perspective view of FIG. 10.

When the subject image is captured with the photographic apparatus 12 in the horizontal position, the subject is typically imaged with the photographic apparatus in a manner shown in FIG. 9, FIG. 10 and FIG. 11. FIG. 9 is a front view when the photographer 20 captures the subject image; FIG. 10 is a front side perspective view; and FIG. 11 is a rear side perspective view. The flash device is located with a relation as shown in the above-described FIG. 2 to FIG. 5.

Since the flashlight-irradiating unit 15 of the flash device is located with the normal position (the horizontal position of the photographic apparatus 12), the flashlight is irradiated in parallel with the optical axis of the photographic apparatus 12 from the flashlight-irradiating unit 15, and hence an excellent subject image can be captured with the horizontal position in a similar fashion as the related art.

Further, since the auxiliary light irradiation unit 13 irradiating the photographic subject side of the photographic apparatus 12 with the focusing auxiliary light is included in the first base 11 securely mounted on the photographic apparatus 12, the positional relation between the photographic apparatus 12 and the auxiliary light irradiation unit 13 is constant and unchanged. Thus, an excellent focus can be obtained.

In addition, display characters (not illustrated) provided close to or provided on the display unit 16 and operation buttons 17 (abbreviated as "the display unit 16 and the like") showing a function of each operational button are displayed in the normal position as shown in FIG. 5 and FIG. 11. Thus, the photographer 20 can see the display in the normal position.

Figure 12:
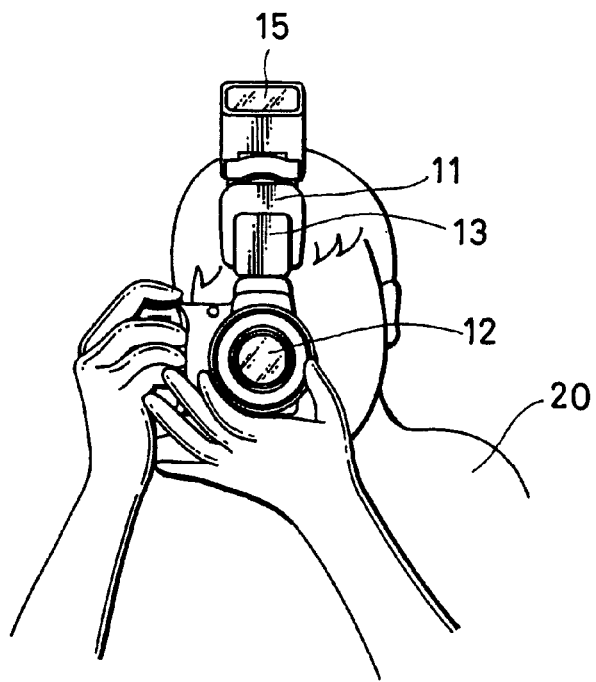
FIG. 12 is a front view showing a state in which the flash device according to the embodiment of the present invention is mounted on the photographic apparatus in performing bounced light photography of a vertical direction.
Figure 13:
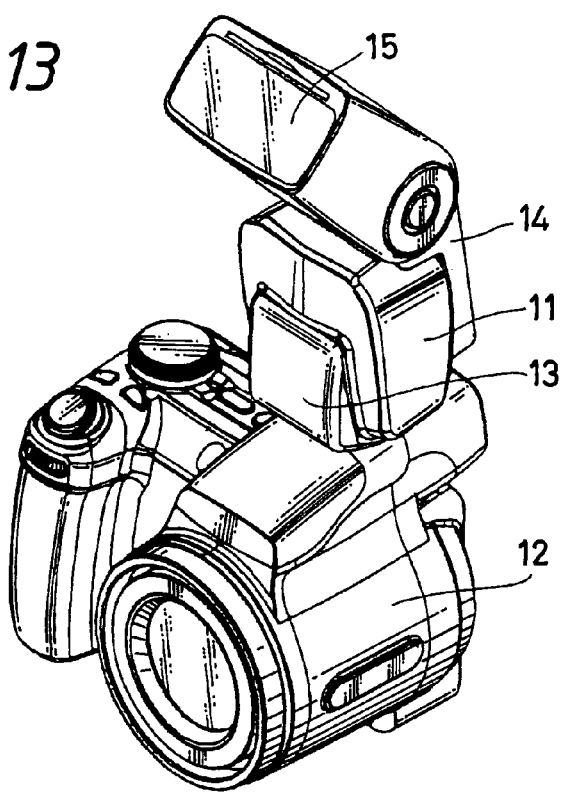
FIG. 13 is a front side perspective view showing a state in which the flash device according to the embodiment of the present invention is mounted on the photographic apparatus in performing bounced light photography in the vertical direction.
Figure 14:
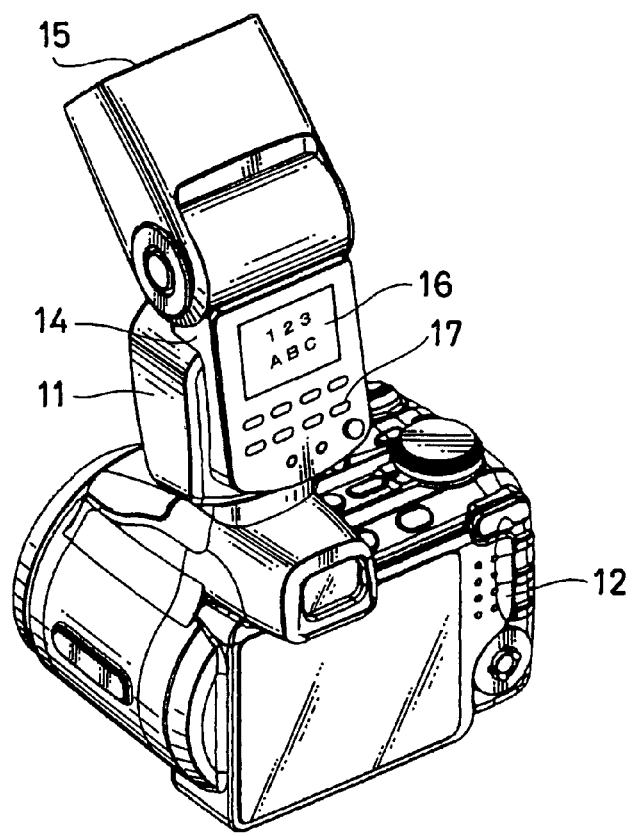
FIG. 14 is a rear side perspective view of FIG. 13.

Next, an embodiment of the present invention in performing bounced light photography when the photographic apparatus 12 is located with the horizontal position is described. When the bounced light photography is performed with the photographic apparatus 12 located with the horizontal position, the flashlight-irradiating unit 15 of the flash device is turned around a shaft that is orthogonal to an axis and that is approximately parallel with the optical axis of the photographic apparatus 12 from the state of FIG. 9, FIG. 10 and FIG. 11. The flashlight-irradiating unit 15 is directed upward to the second base 14 at a prescribed angle, as shown in FIG. 12, FIG. 13 and FIG. 14, such that the flashlight-irradiating unit 15 can direct the flashlight at the ceiling. FIG. 12 is a front view when the photographer 20 performs bounced light photography with the photographic apparatus 12 in the horizontal position; FIG. 13 is a front side perspective view; and FIG. 14 is a rear side perspective view.

Figure 15:
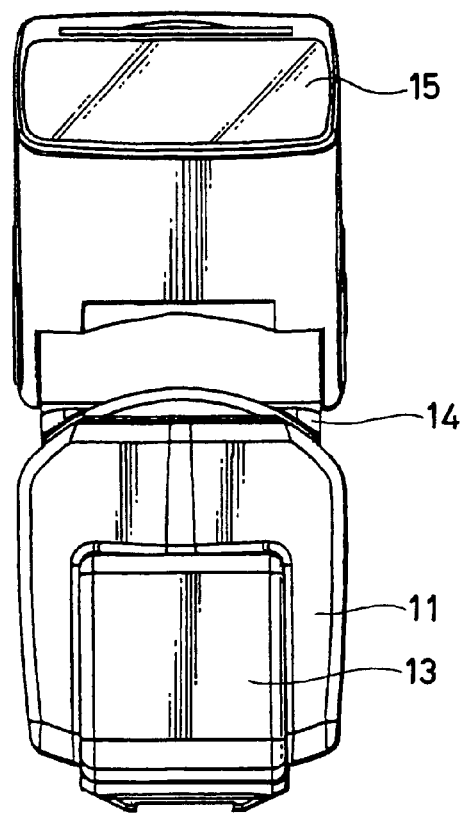
FIG. 15 is a front view in a case where bounced light photography in the vertical direction is performed in the example of the best mode for carrying out the embodiment of the flash device according to the present invention.
Figure 16:
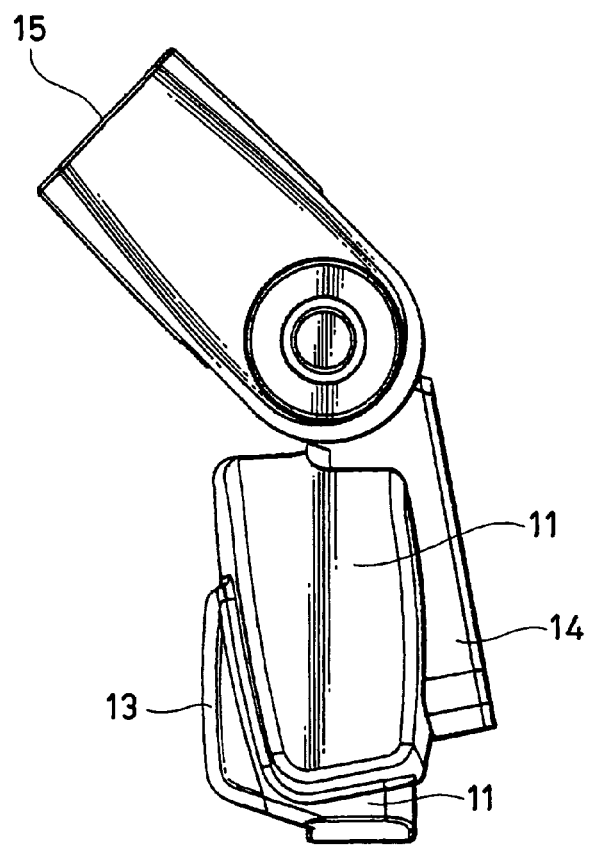
FIG. 16 is a right side view of FIG. 15.
Figure 17:
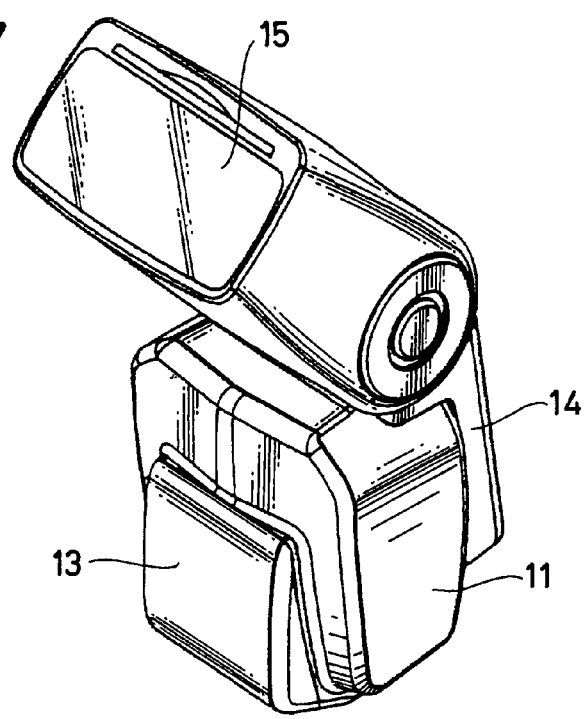
FIG. 17 is a front side perspective view of FIG. 15.
Figure 18:
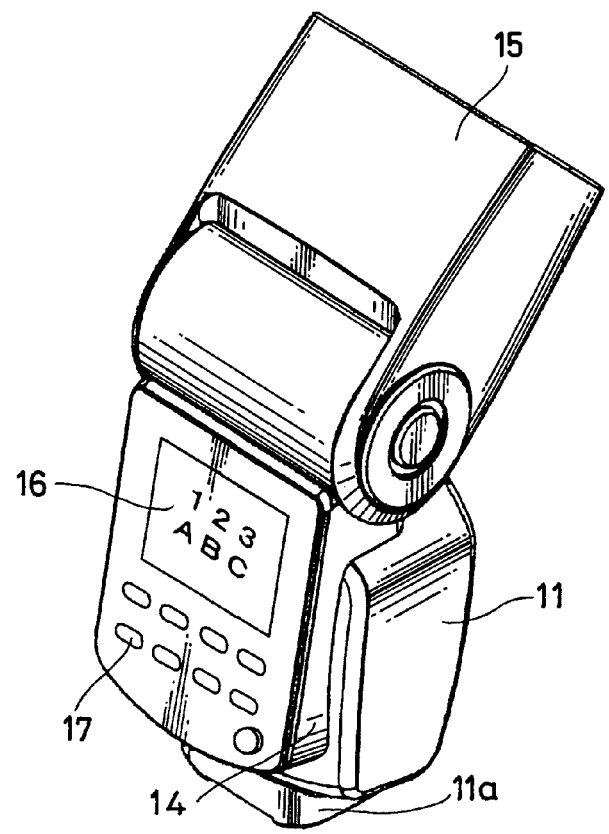
FIG. 18 is a rear side perspective view of FIG. 15.

FIG. 15, FIG. 16, FIG. 17 and FIG. 18 show a flash device when the bounced light photography is performed with the photographic apparatus 12 in the horizontal position. FIG. 15 shows a front view when the bounced light photography is performed with the photographic apparatus 12 in the horizontal position; FIG. 16 shows a right side perspective view; FIG. 17 shows a front side perspective view; and FIG. 18 shows a rear side perspective view.

At this time, the ceiling is irradiated with the flashlight from the flashlight-irradiating unit 15 of the flash device, and thus an excellent bounced light photography can be performed with the photographic apparatus 12 in the horizontal position.

Since the positional relation of the auxiliary light irradiation unit 13 with the photographic apparatus 12 is the same as that obtained in the above-described typical photographing, an excellent focus can be obtained with the photographic subject by focusing the auxiliary light irradiated from the auxiliary light irradiation unit 13.

Moreover, since the display unit 16 and the like are in the normal position, the photographer 20 can see the display in the normal position as shown in FIG. 14, FIG. 18.

Figure 19:
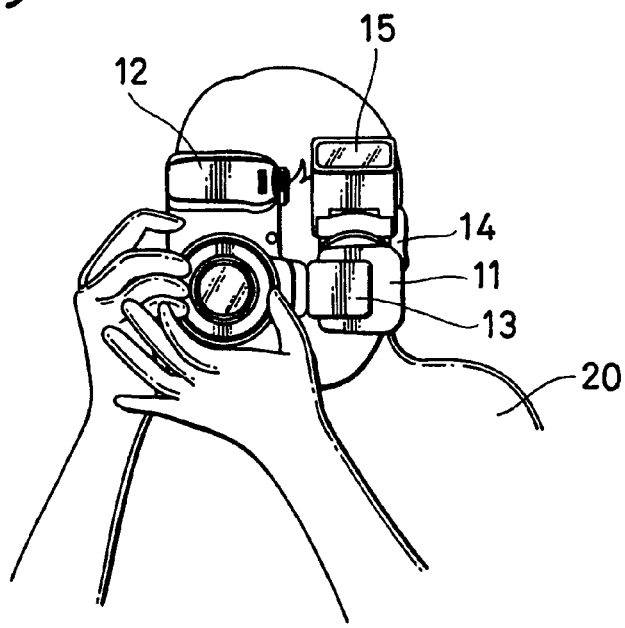
FIG. 19 is a front view showing a state in which the flash device according to the embodiment of the present invention is mounted on the photographic apparatus in performing bounced light photography of a horizontal direction.
Figure 20:
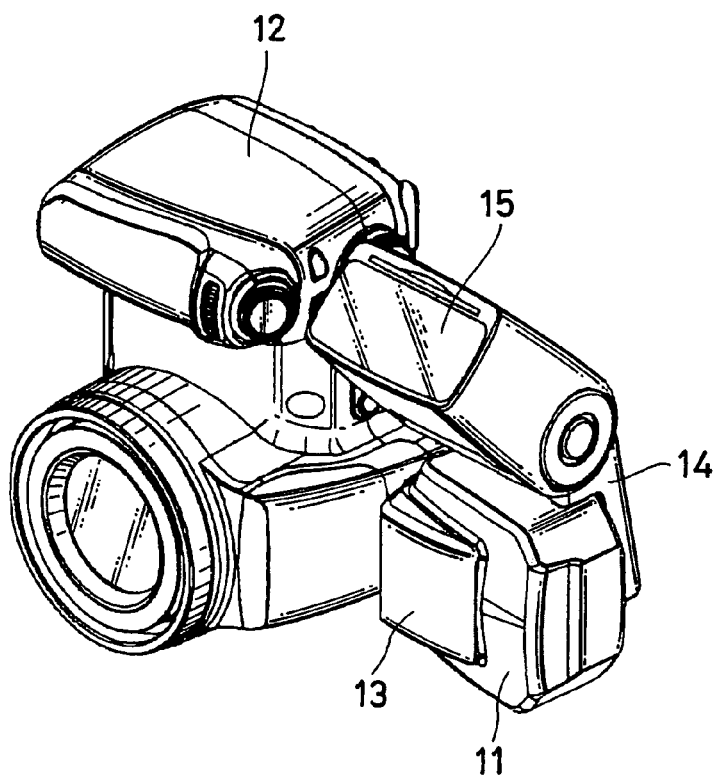
FIG. 20 is a front side perspective view showing a state in which the flash device according to the embodiment of the present invention is mounted on the photographic apparatus in performing bounced light photography in the horizontal direction.
Figure 21:
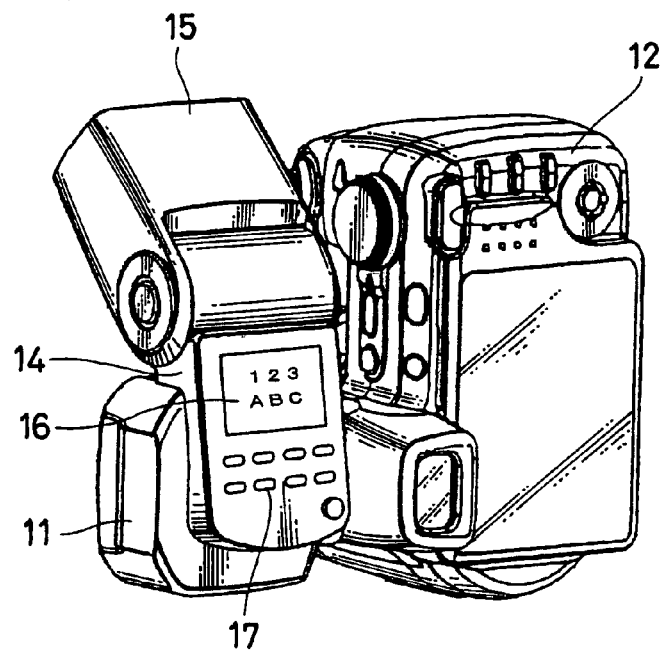
FIG. 21 is a rear side perspective view of FIG. 20.

Next, an embodiment of the present invention is described when the photographic apparatus 12 is turned 90° and located with the vertical position, and then bounced light photography is performed. When bounced light photography is performed with the photographic apparatus 12 in the vertical position, the photographic apparatus 12 is turned 90° from the position of the photographic apparatus 12 in FIG. 12, FIG. 13 and FIG. 14. The second base 14 is turned 90° around the shaft approximately parallel with the optical axis of the photographic apparatus 12 relative to the first base 11, as shown in FIG. 19, FIG. 20 and FIG. 21. The temporary fixing unit of the click mechanism clicks to fixate the flashlight-irradiating unit 15, and the ceiling is irradiated with the flashlight from the flashlight-irradiating unit 15 of the flash device. FIG. 19 is a front view when the photographer 20 performs bounced light photography with the photographic apparatus 12 in the vertical position. FIG. 20 is a front side perspective view. FIG. 21 is a rear side perspective view.

Figure 22:
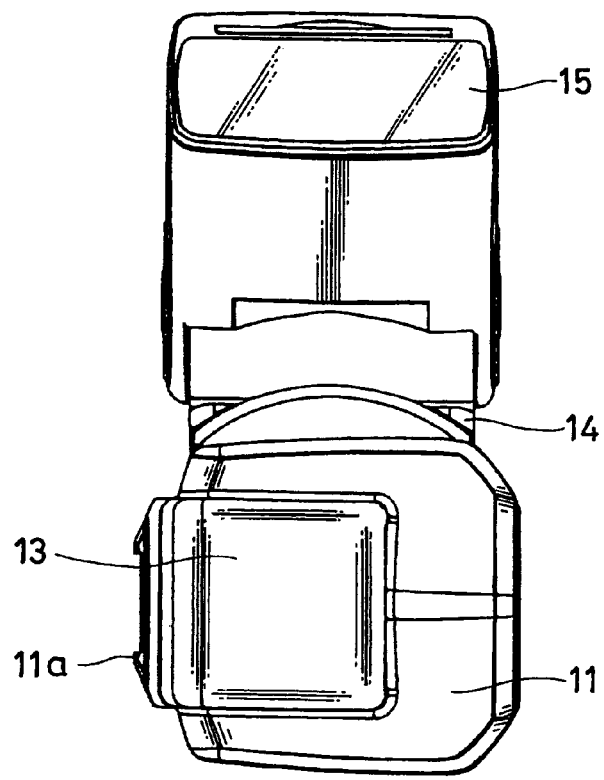
FIG. 22 is a front view in a case where bounced light photography in the horizontal direction is performed in the example of the best mode for carrying out the embodiment of the flash device according to the present invention.
Figure 23:
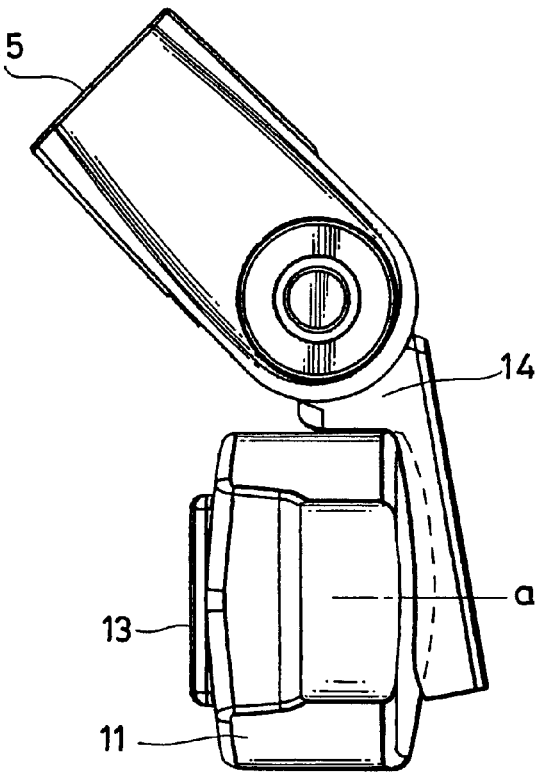
FIG. 23 is a right side view of FIG. 22.
Figure 24:
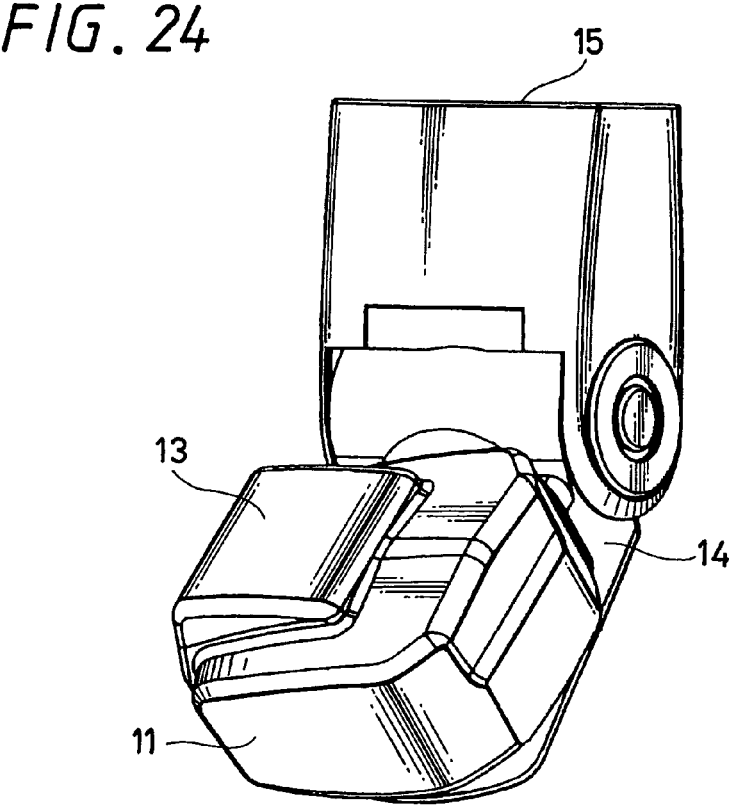
FIG. 24 is a front side perspective view of FIG. 22.
Figure 25:
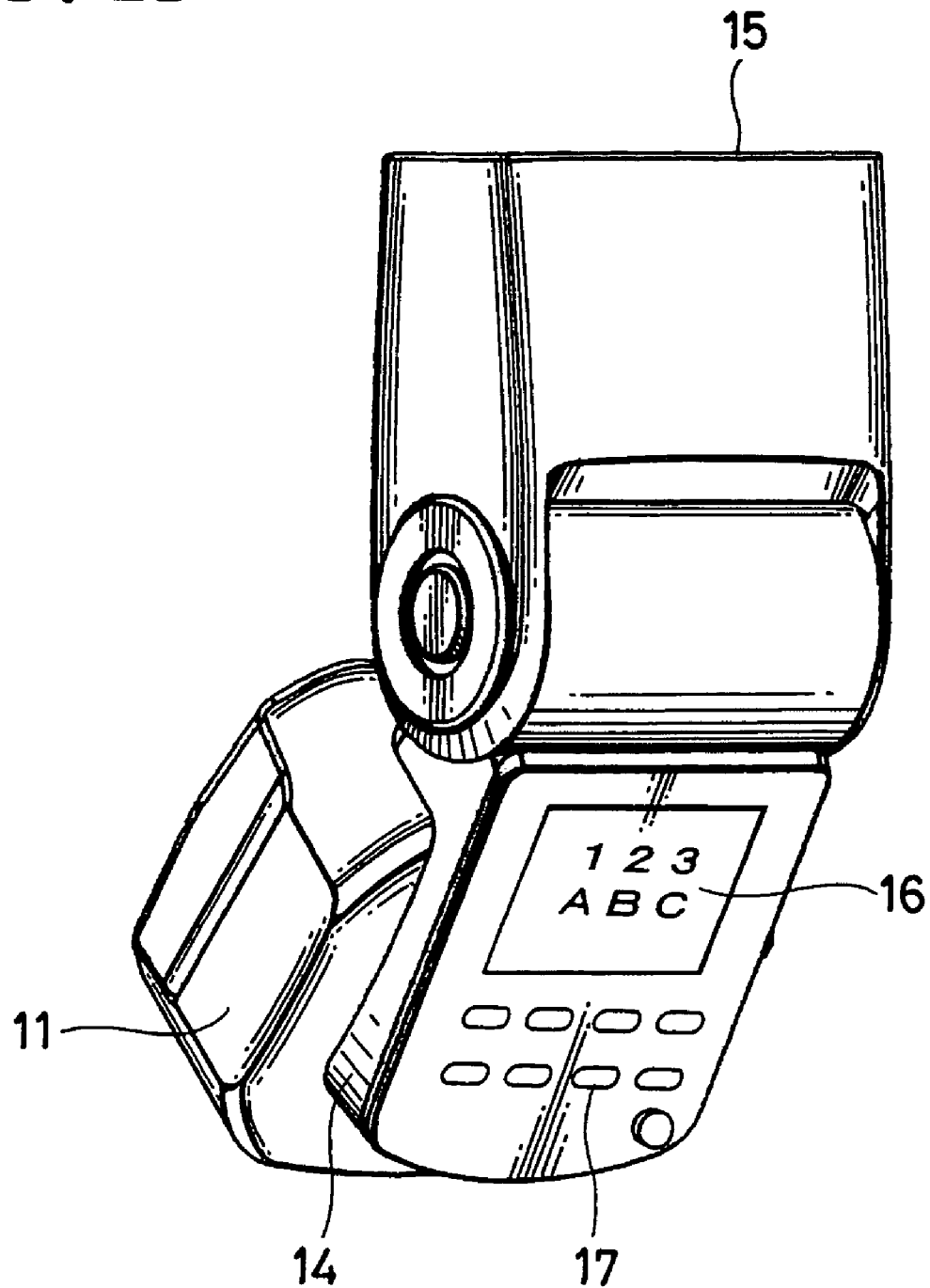
FIG. 25 is a rear side perspective view of FIG. 15.

FIG. 22, FIG. 23, FIG. 24 and FIG. 25 show a position of the flash device when bounced light photography is performed with the photographic apparatus 12 in the vertical position. FIG. 22 shows a front view when the bounced light photography is performed with the photographic apparatus 12 in the vertical position; FIG. 23 shows a right side perspective view; FIG. 24 shows a front side perspective view; and FIG. 25 shows a rear side perspective view.

The photographic apparatus 12 is located in a 90° turned direction; however, the flashlight-irradiating unit 15 of the flash device has the same irradiating condition of the light as that of the bounced light photography performed with the photographic apparatus 12 in the horizontal position as shown in FIG. 20, FIG. 22, FIG. 23 and FIG. 24. Excellent bounced light photography can be performed by irradiating the ceiling with the flashlight from the flashlight-irradiating unit 15 in the vertical position. In this case, the photographer 20 can see that the second base 14 is turned 90° relative to the first base 11 without visual observation since the photographer 20 can be informed by the click mechanism when the bounced light photography can be performed with the photographic apparatus 12 in the horizontal position and vertical position under the same flashlight irradiation condition. Thus, the photographer 20 can concentrate on photographing.

Since the photographic apparatus 12 is turned 90° only, the positional relation of the auxiliary light irradiation unit 13 with the photographic apparatus 12 remains the same as that in the above-described typical photographing, and thus an excellent focus on the photographic subject can be obtained using the focusing auxiliary light irradiated from the auxiliary light irradiation unit 13.

Further, the photographic apparatus 12 is turned 90°, and the second base 14 is turned 90° relative to the first base 11, and thus the display unit 16 and the like are located in the normal position such that the photographer 20 can see the display in the normal position as shown in FIG. 21 and FIG. 25.

Figure 26:
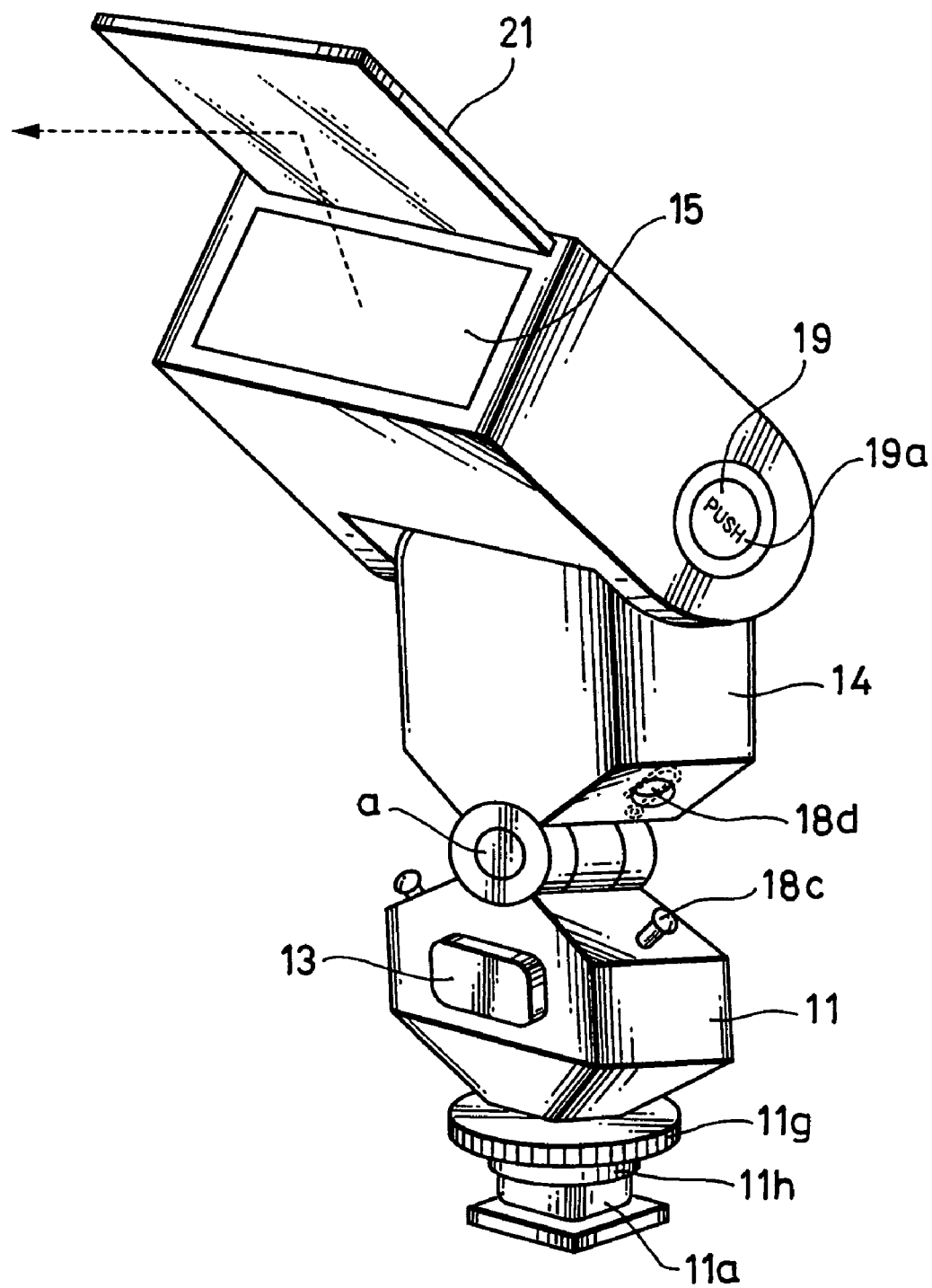
FIG. 26 is a front side perspective view in a case where bounced light photography in the vertical direction is performed in another example of the best mode for carrying out an embodiment of a flash device according to the present invention.
Figure 27:
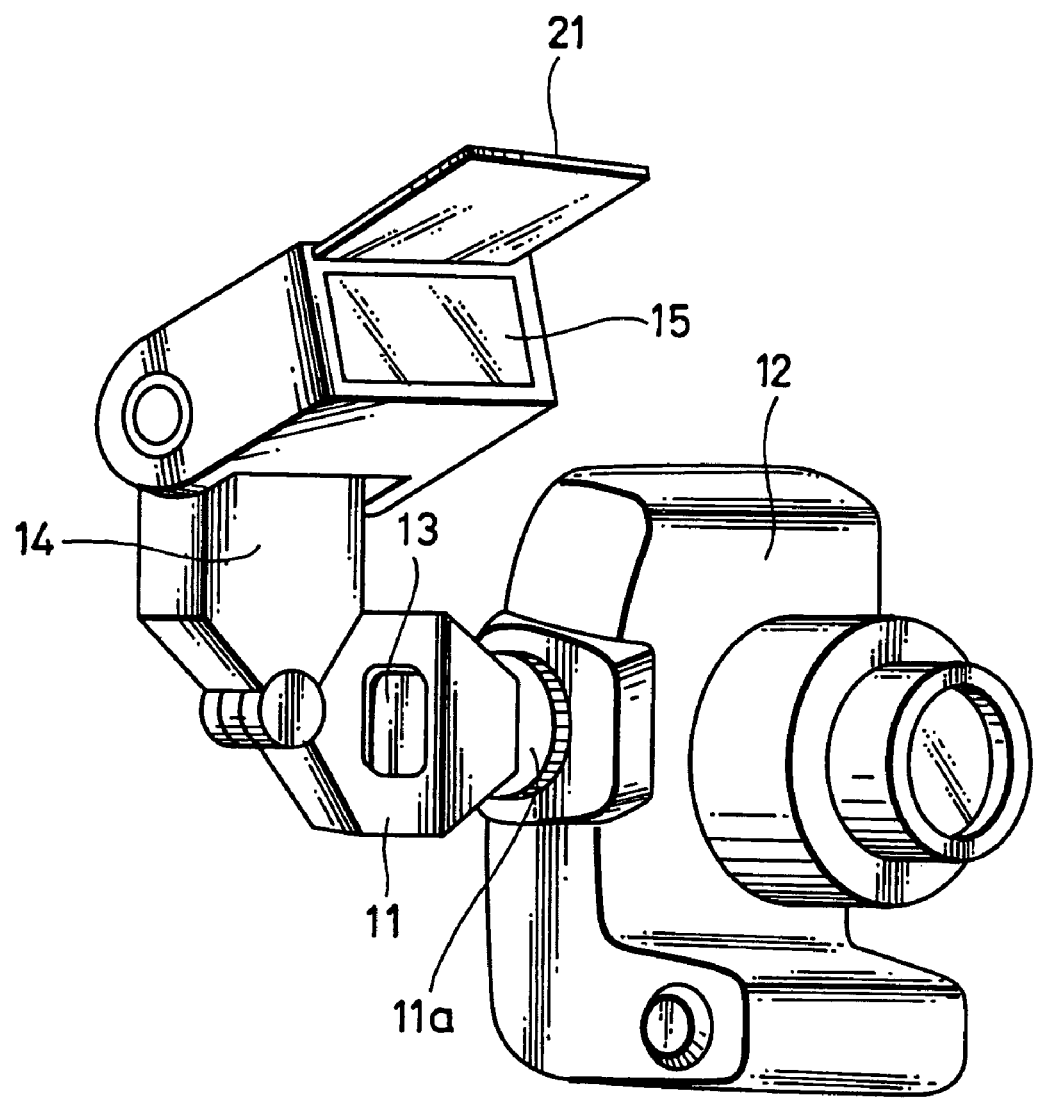
FIG. 27 is a front side perspective view in performing bounced light photography in the horizontal direction in the example of FIG. 26.
Figure 28:
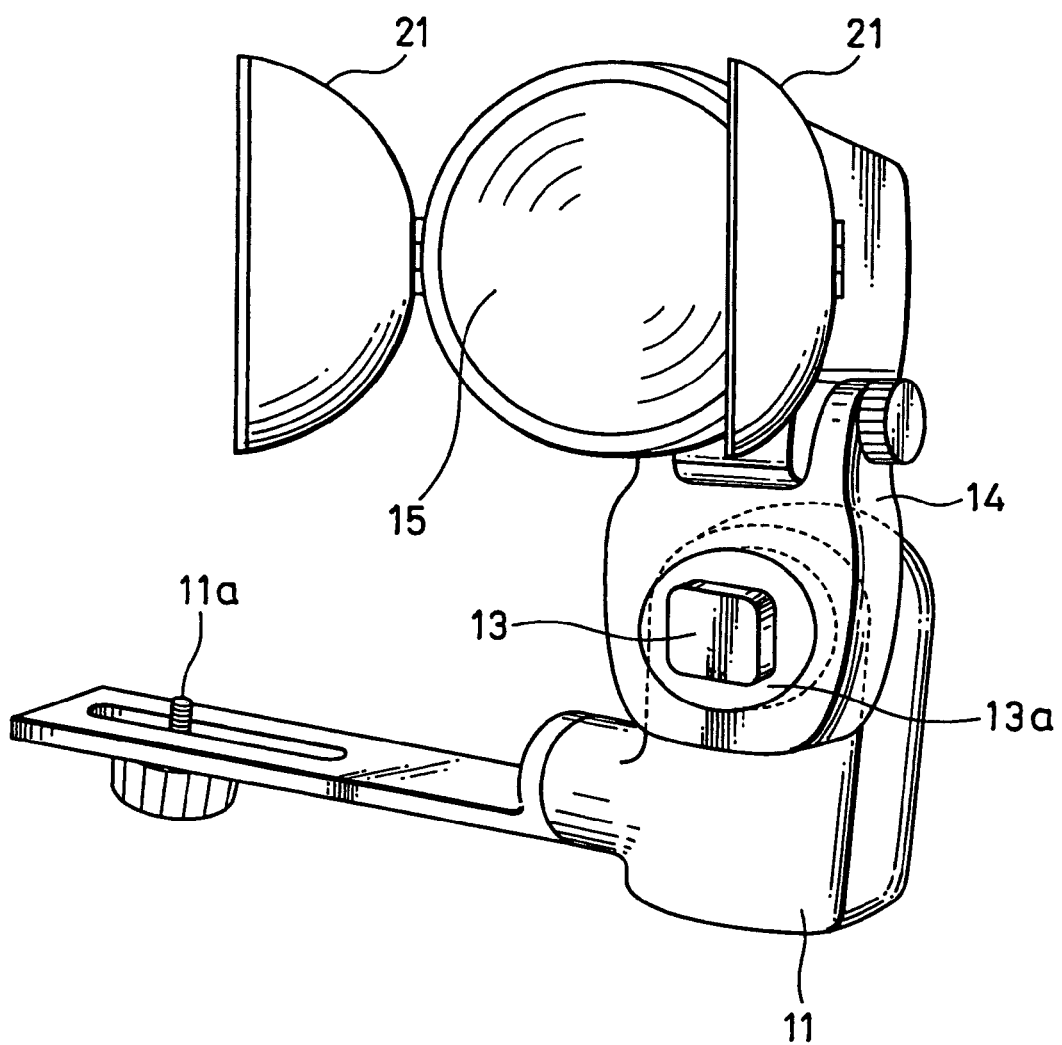
FIG. 28 is a front side perspective view showing still another example of the best mode for carrying out an embodiment of a flash device according to the present invention.

FIG. 26, FIG. 27 and FIG. 28 show another example of the best mode for carrying out an embodiment of the present invention. In describing the example shown in each of FIG. 26, FIG. 27 and FIG. 28, the same reference numerals corresponding to FIG. 2 to FIG. 25 are provided and duplicated explanations thereof are omitted.

In FIG. 26 and FIG. 27, FIG. 26 shows the flash device in a case where bounced light photography is performed with the photographic apparatus 12 in the horizontal position, and FIG. 27 shows a case in which the photographic apparatus 12 is turned 90° and the bounced light photography is performed with the photographic apparatus 12 in the vertical position.

In FIG. 26 and FIG. 27, the first base 11 and the second base 14 differ in shape from those shown in FIG. 2 to FIG. 25. The mounting portion 11a on the accessory shoe of the mounting portion 12a fixed on the upper part of the photographic apparatus 12 is provided on a lower part of the first base 11. Further, when a rotary knob 11g on the mounting portion 11a is turned, the accessory shoe is securely sandwiched between a cylindrical portion 11h and a mounting base integrally formed with the rotary knob 11g. FIG. 26 and FIG. 27 show a configuration where the second base 14 is mounted on the upper part of the first base 11 such that the second base 14 can turn around shaft which is approximately parallel with the optical axis of the photographic apparatus 12, and the flashlight-irradiating unit 15 is mounted on the second base 14 such that the flashlight-irradiating unit 15 can turn in the vertical direction around the shaft 19 which is orthogonal to the optical axis of the photographic apparatus 12 and is approximately horizontal when the photographic apparatus 12 is located with the horizontal position.

In FIG. 26 and FIG. 27, the flash device is configured such that the flashlight-irradiating unit 15 can be turned while a push button 19a on the rotary shaft 19 of the flashlight-irradiating unit 15 is pressed and is fixed at the angle when the button 19a is released.

In addition, a projection 18c with a spherical portion on a top end thereof is provided on the side of a first base 11 as the temporary fixing unit to fix the second base 14 to the first base 11 when turning 90° relative to the first base 11, a hole into which the projection 18c is inserted is provided on the side of second base 14, and a wire spring 18d to engage with the projection 18c is provided inside the hole.

Further, a white reflector plate 21 is provided on the upper side of the flashlight-irradiating unit 15 of the FIG. 26 and the FIG. 27 such that the ceiling is irradiated with the flashlight irradiated from the flashlight-irradiating unit 15 and part of the flashlight is reflected and can irradiate the photographic subject in arbitrary directions. The white reflector plate 21 is optionally provided on the upper side of the flashlight-irradiating unit 15, and hence excellent photographing can be performed.

Figure 1A:
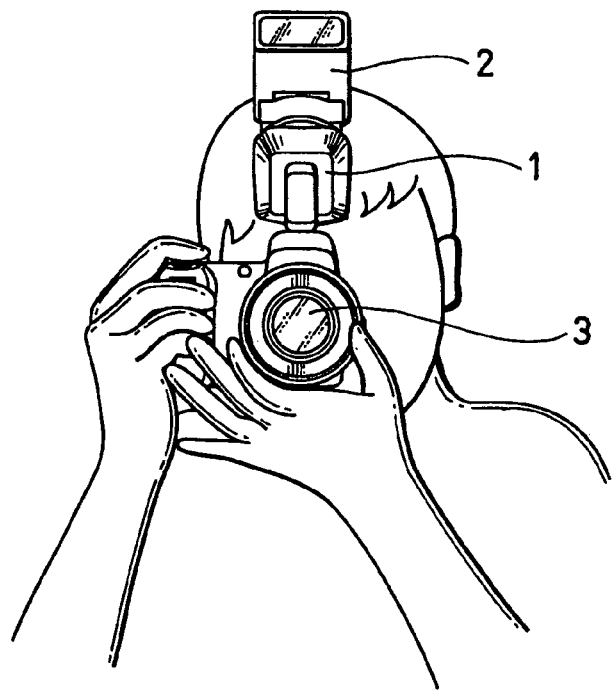
FIGS. 1A and 1B show an example of a flash device of the related art.
Figure 1B:
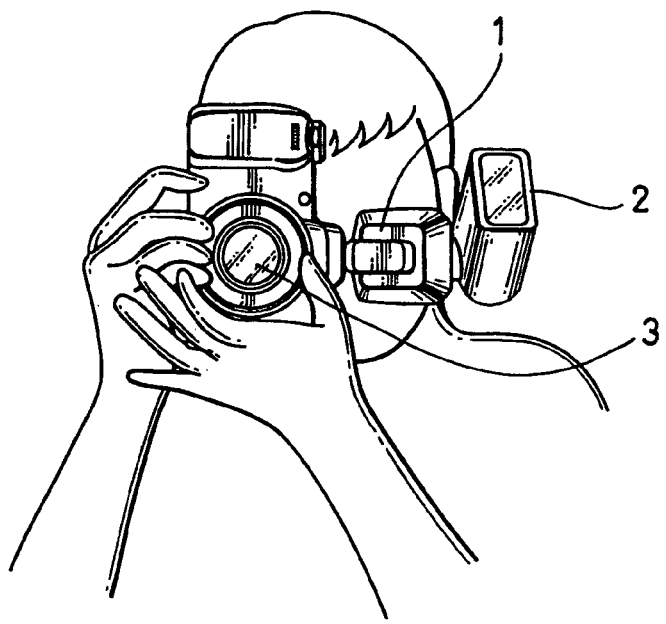

It can be easily understood that a similar effect to that obtained in the examples of FIG. 2 to FIG. 25 also can be obtained in the examples of FIG. 26 and FIG. 27. If the white reflector plate is installed in FIGS. 1A and 1B of the related art, the irradiation conditions of the light are changed in FIG. 1B since the white reflector plate is positioned in the vertical direction.

In an example in FIG. 28, the flash device is mounted on the photographic apparatus 12 and a fixing screw is provided for the tripod attachment screw hole for fixing the flash device to a tripod attachment screw hole of the photographic apparatus 12 as the mounting portion 11a of the first base 11. Further, the second base 14 is mounted such that the second base 14 can turn around the shaft 13a provided on an outer circumference of the auxiliary light irradiation unit 13 in the first base 11, the axis of which is approximately parallel with the optical axis of the photographic apparatus 12. Furthermore, the flashlight-irradiating unit 15 is mounted on the second base 14 such that the flashlight-irradiating unit 15 can turn around the shaft in the vertical direction that is orthogonal to the optical axis of the photographic apparatus 12 and is approximately horizontal when the photographic apparatus 12 is located with the horizontal position. In addition, the white reflector plates 21 are provided on the right and left of the flashlight-irradiating unit 15, and thus part of the flashlight is reflected so that the flashlight irradiating the photographic subject can be adjusted.

It can be easily understood that a similar effect to that obtained in the examples of FIG. 2 to FIG. 27 is also obtained in the example of FIG. 28.

It is needless to say that an embodiment of the present invention is not limited to the above-described embodiments, and other various configurations are also possible without departing from the scope and sprit of the present invention.

It should be understood by those skilled in the art that various modifications, combinations, subcombinations and alterations may occur depending on design requirements and other factors insofar as they are within the scope of the appended claims or the equivalents thereof.

What is claimed is:

1. A flash device comprising:
a mounting portion removably mounting the flash device on a photographic apparatus;
a first base having the mounting portion;
a second base mounted on the first base such that the second base can pivot about a first shaft, the first shaft extending along a first shaft axis oriented at least approximately parallel with an optical axis of the photographic apparatus with the optical axis and the first shaft axis being in a spaced-apart relationship; and
a flashlight-irradiating unit mounted on the second base such that the flashlight-irradiating unit can pivot about a second shaft, the second shaft extending along a second shaft axis oriented at least approximately perpendicularly to the first shaft axis and the optical axis with the second shaft axis being in a spaced-apart relationship with both the optical axis and the first shaft axis, wherein the first base has an auxiliary light irradiation unit to irradiate a photographic subject with auxiliary light.

2. The flash device according to claim 1, further comprising:
a display unit at least displaying the setting of the flashlight-irradiating unit provided on the second base.

3. The flash device according to claim 2, further comprising:
a setting unit in the vicinity of the display unit.

4. The flash device according to claim 1, further comprising:
a temporary fixing unit temporarily fixing the second base when the second base is turned 90° relative to the first base.

5. The flash device according to claim 1, wherein a prescribed pattern is irradiated when irradiating the auxiliary light.

6. The flash device according to claim 1, further comprising:
a flashlight reflector on the flashlight-irradiating unit with which at least part of the flashlight is reflected.

* * * * *